June 4, 1968  E. H. LAND  3,386,825

PHOTOGRAPHIC PRODUCT CONTAINING ZINC

Filed Dec. 30, 1966  2 Sheets-Sheet 1

INVENTOR.
Edwin H. Land
BY Brown and Mikulka
and
Stanley H. Morruis
ATTORNEYS

United States Patent Office 3,386,825
Patented June 4, 1968

3,386,825
PHOTOGRAPHIC PRODUCT CONTAINING ZINC
Edwin H. Land, Cambridge, Mass., assignor to Polaroid Corporation, Cambridge, Mass., a corporation of Delaware
Continuation-in-part of application Ser. No. 249,922, Jan. 7, 1963, which is a continuation-in-part of application Ser. No. 705,845, Dec. 30, 1957. This application Dec. 30, 1966, Ser. No. 606,290
6 Claims. (Cl. 96—66)

ABSTRACT OF THE DISCLOSURE

Image-receiving elements and processing compositions for use in diffusion transfer photographic processes and containing finely dispersed zinc are disclosed. Such zinc dispersions may be prepared by vacuum depositing zinc upon an organic plastic material and blending the materials to disperse the zinc within the organic plastic material. The finely dispersed zinc may be used as an antioxidant in photographic processes and products.

---

This application is a continuation-in-part of Ser. No. 249,922 filed Jan. 7, 1963 (now U.S. Patent No. 3,295,972 issued Jan. 3, 1967), as a continuation-in-part of Ser. No. 705,845, filed Dec. 30, 1957, and now abandoned.

The present invention relates, in general, to novel uses of fine dispersions of zinc in photographic processes and products, and to methods for producing fine dispersions of zinc of exceptionally uniform character.

A primary object of the present invention is to provide a process for producing a dispersion of finely divided zinc distributed uniformly in an external phase incompatible therewith, the process comprising the steps of first vacuum depositing the zinc onto a matrix material mechanically possessing large surface area, and then blending the materials in order to disperse the zinc (internal phase material) in the external phase material.

Other objects of the present invention are: to provide a novel photographic process involving subjecting an exposed silver halide stratum, in the presence of a fine dispersion prepared in the foregoing way, to a processing fluid for developing silver halide and for cooperating with the fine dispersion to form a transfer print; and to provide a novel photographic process involving the use of a fine dispersion of zinc as an antioxidant.

Other objects of the invention will in part be obvious and will in part appear hereinafter.

The invention accordingly comprises the several steps and the relation and order of one or more of such steps with respect to each of the others, and the scope of the application of which will be indicated in the claims.

For a fuller understanding of the nature and objects of the invention, reference should be had to the following detailed description taken in connection with the accompanying drawings wherein.

Generally, as indicated above, the processes of the present invention herein disclosed involve vacuum depositing at least part of the material, i.e., zinc, that is to constitute the internal phase onto a matrix material mechanically possessing large surface area, and then blending the materials in order to disperse or to prepare to disperse the internal phase material in at least part of the material that is to constitute the external phase. The step of vacuum depositing involves either evaporating or sputtering at pressures below 100 microns of mercury and usually within the range of from 0.1 to 100 microns of mercury, these pressures being produced by continuous evacuation to ensure the rapid removal of any gases produced during the vacuum deposition process. The internal phase material is transmitted to the matrix material in submicroscopic, e.g., molecular or atomic, form. The matrix material, which may constitute at least a proportion of the external phase, initially is in powder-like or sheet-like form for the purpose of providing large surface area per mass. Where the matrix material is to constitute the external phase exclusively, the ultimate dispersion may be produced from the coated matrix material by blending, for example, by molding under heat or casting, spraying or flowing from solution. Where the matrix material is not to constitute the external phase exclusively, the matrix material, after being coated, may be blended in any suitable way with the remaining materials of the external phase, for example, may be dissolved in a solution already containing these remaining materials. The present invention provides a flexible technique for providing dispersions in which the internal phase, the external phase or both comprise a plurality of different materials. Thus, one or more internal phase materials may be vacuum deposited on one or more matrix materials and the resulting materials blended with one or more additional materials to provide a dispersion of desired formulation.

Figure 1:
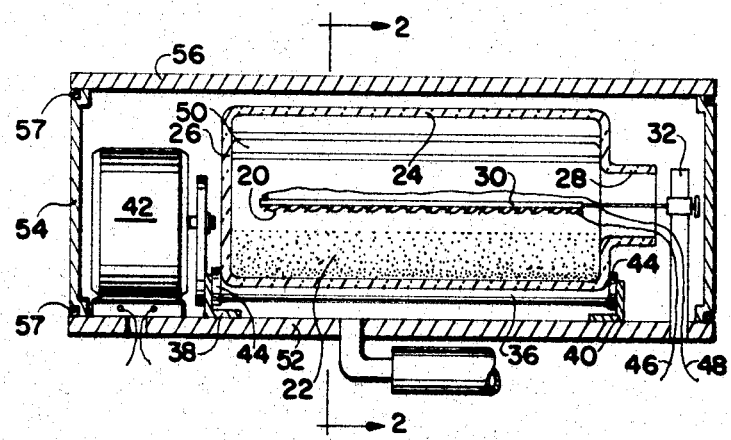
FIGURE 1 is a broken-away, side elevation of an apparatus for performing steps of a process of the present invention.
Figure 2:
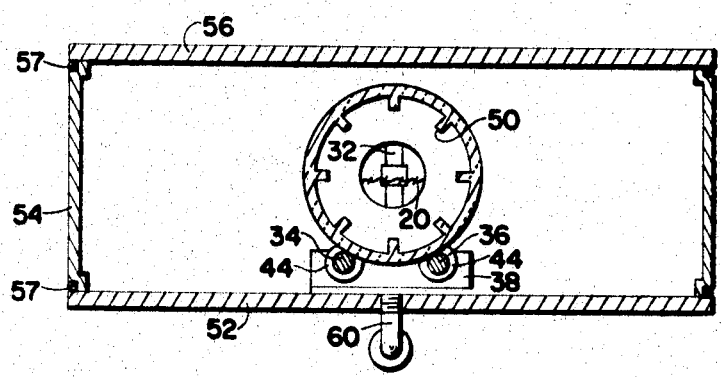
FIGURE 2 is a cross section of the apparatus of FIGURE 1, taken substantially along the line 2—2.

FIGURE 1 illustrates an apparatus for evaporating an internal phase material 20 onto a matrix material 22 of large surface area per mass. Material 20, for example, is a metal in the form of a coating upon a wire gauze and material 22, for example, is in the form of a finely divided powder composed of an organic plastic. Powder 22 is contained within a cylindrical glass jar 24, one end of which closed at 26 and the other end of which is provided with an open mouth 28. Gauze 20 is supported by a mounting arm 30 extending through mouth 28 and carrier by a standard 32. Jar 24 rests upon a pair of rollers 34 and 36, the ends of which are journaled in bearing mounts 38 and 40. A motor 42 is provided for rotating rollers 34 and 36 through gearing 37 in order to cause rotation of jar 24, which is prevented from moving longitudinally by circular flanges 44 at the ends of the rollers. As shown, electrical leads 46 and 48 are connected to the opposite extremities of gauze 20 in order to transmit a suitable electric current through the gauze from a power supply (not shown). In operation, a sufficient current is transmitted by leads 46 and 48 through gauze 20 for generating sufficient heat to cause rapid evaporation of the coating of gauze 20. At the same time, motor 42 causes rotation of rollers 34 and 36 so that powder 22 is continuously agitated by movement of the inner surfaces of jar 24, as well as a plurality of ribs 50 projecting inwardly from the inner surfaces of the jar. The apparatus, including jar 24, is mounted on a base plate 52 and enclosed by such means as a glass cylinder 54 and a cover plate 56. O-ring gaskets 57 hermetically seal glass cylinder 54 between base plate 52 and cover plate 56. A pump (not shown) continuously exhausts the region defined by base plate 52, glass cylinder 54 and the cover plate 56 through a conduit 60. Powder 22, as a result, becomes coated with the metal which initially is part of gauze 20. The coated powder then is heated and molded or dissolved and cast to form a two-phase solid comprising the metal of gauze 20 as an internal phase and the plastic of powder 22 as an external phase.

Figure 3:
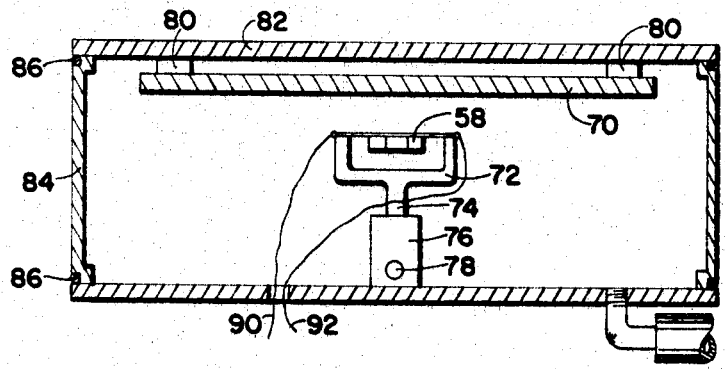
FIG. 3 is a broken-away, side elevation of an apparatus for performing steps of an alternative process of the present invention.
Figure 4:
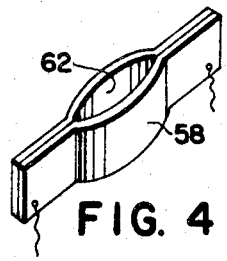
FIGURE 4 is a perspective view of a component of the apparatus of FIG. 3.

An alternative method for producing a dispersion in accordance with the present invention is shown in FIGS. 3 and 4 as involving the volatilization of a quantity of an internal phase material 62, for example, a metal within an electrically heated crucible 58, typically composed of tantalum, above which is located an extremely thin sheet of a matrix material 70 in the form of an organic plastic. As shown, crucible 58 is carried by a mount 72 having a depending shaft 74, which is adjustably secured in an upstanding sleeve 76 by a manually controlled screw 78. Sleeve 76 is carried by a base plate 77. Sheet 70 is carried by a pair of supports 80, in turn mounted under a cover plate 82. The region defined by the base plate 77 and cover plate 82 is enclosed by a glass cylinder 84, which is hermetically sealed between the base plate and the cover plate by a pair of upper and lower O-rings 86. In operation, the region defined by base plate 77, glass cylinder 84 and cover plate 82 is continuously exhausted by a pump (not shown) through a conduit 88 and crucible 58 is heated by a relatively large current supplied through a pair of leads 90 and 92. The coated sheet 70 then is heated and molded or dissolved and cast to form a two-phase solid comprising metal 62 as an internal phase and the plastic of sheet 70 as an external phase.

Figure 5:
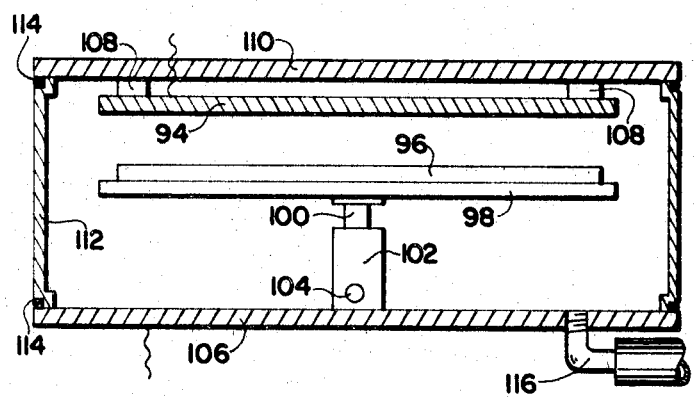
FIG. 5 is a broken-away, side elevation of an apparatus for performing steps of another alternative process of the present invention.

Another alternative method for producing a dispersion in accordance with the present invention is shown in FIG. 5 as involving so-called "cathode sputtering." When an electrical discharge is passed between electrodes under low gas pressure, the cathode electrode is slowly disintegrated under bombardment by ionized gas molecules. The disintegrated material leaves the cathode surface either as free atoms or in chemical combination with the residual gas molecules. Some of the liberated atoms are condensed on surfaces surrounding the cathode.

As shown in FIG. 5, in accordance with the present invention, a material, for example, a metal to form the internal phase is sputtered from a cathode 94 onto a sheet 96 of a matrix material, for example, an organic pastic that is to form the external phase. Sheet 96 is carried by a mount 98 having a depending shaft 100, which is adjustably secured within an upstanding sleeve 102 by a manually controlled screw 104. Upstanding sleeve 102 is supported upon a base plate 106. Cathode 94 is carried under a cover plate 110 by a pair of insulating spacers 108. The region defined by base plate 106 and cover plate 110 is enclosed by a metallic cylinder 112, which is hermetically sealed between the base plate and the cover plate by a pair of upper and lower O-rings 114. In operation, the region defined by base plate 106, cylinder 112 and cover plate 110 is continuously exhausted by a pump (not shown) through a conduit 116. A voltage capable of producing sputtering within an atmosphere at the pressure determined by the pump is applied between cylinder 112 and cathode 94 which, when so excited, transmits atomic or molecular particles to sheet 96. The coated sheet 96 then is heated and molded or dissolved and cast to form a two-phase solid comprising the metal from cathode 94 as an internal phase and the plastic of sheet 96 as an external phase.

As indicated above, although the process of the present invention has general utility, it is specifically applicable to certain products that are particularly useful in photographic diffusion transfer processes. In a silver diffusion transfer process, for example, a photoexposed silver halide material and a silver precipitating material are subjected to an aqueous alkaline solution of a silver halide developing agent and a silver halide solvent. The developing reduces exposed silver halide to silver and the solvent reacts with unreduced silver halide to form a complex silver salt that migrates to the silver precipitating material where it is reduced to form a visible silver print. It has been found that zinc is particularly effective in such processes, particularly when dispersed in accordance with the present invention. Vacuum deposition permits close control of particle size and thus facilitates the use of particle sizes most suitable for activity and the desired level of covering power.

Plastic materials of which the external phase may be composed advantageously are cellulosics such as carboxymethyl cellulose and cellulose acetate hydrogen phthalate, vinyls such as polyvinyl alcohols, nylons such as polyhexamethylene adipamide, and natural polymers such as agar, casein, gelatin, etc. One may also use plastics which are normally impermeable or only slightly permeable to the photographic processing solution, provided that such plastics may be rendered permeable by a treatment, e.g., acid hydrolysis, which does not adversely affect the dispersed zinc. When the vacuum deposition is effected by evaporation, temperatures ranging from 300 to 1500° C., in accordance with the requirements of the material being evaporated, and pressures below 0.5 micron of mercury are common. When the vacuum deposition is effected by cathode sputtering, voltages of the order of 5 to 10 kilovolts, and pressures of from 10 to 20 microns of mercury are common.

Figure 6:
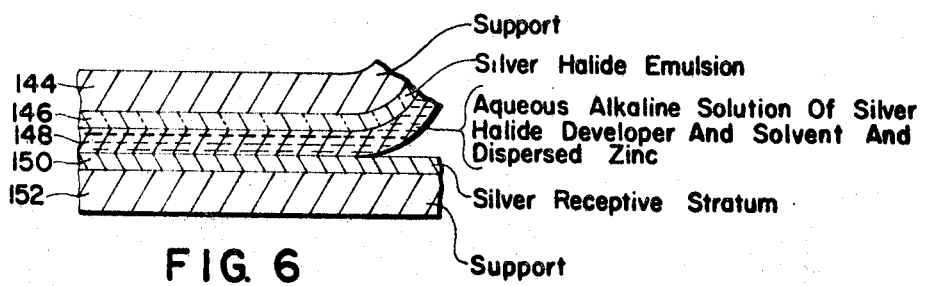
FIG. 6 is a flow diagram showing exaggerated cross-sectional views of materials undergoing steps of a photographic process of the present invention.

FIG. 6 illustrates a diffusion transfer process in accordance with the present invention. A silver print is formed in stratum 150 when a silver halide processing fluid 148 is spread in a uniformly thin layer between adjacent superposed surfaces of silver-receptive stratum 150 and a photoexposed photosensitive silver halide emulsion 146 that is coated upon a support 144. Processing fluid 148 contains an alkaline aqueous solution of a silver halide developing agent, a silver halide solvent, and finely dispersed zinc. The spreading, for example, may be accomplished by advancing the sheets, together with the fluid, between a pair of pressure-applying rollers. Further details of processes of this type are disclosed in U.S. Patent No. 2,543,181, issued to Edwin H. Land on Feb. 27, 1951, and in many other patents. Examples of suitable silver precipitating agents may be found in the aforementioned parent application, now U.S. Patent No. 3,295,972, which disclosure is hereby incorporated.

Photosensitive stratum 150 may contain one or more of the silver halides, of which silver chloride, silver bromide and silver iodide are examples, dispersed in a suitable protective colloidal material, for example, gelatin, agar (albumen, casein, collodion, a cellulosic such as carboxymethyl cellulose, a vinyl polymer such as polyvinyl alcohol or a linear polyamide such as polyhexamethylene adipamide. Examples of specific formulations of conventional emulsions suitable for such use are described in T. T. Baker, Photographic Emulsion Technique, American Photographic Publishing Co., Boston, 1948, ch. IV.

Suitable silver halide developing agents are: benzene derivatives having at least two hydroxyl and/or amino groups substituted in ortho or para position on the benzene nucleus, such as hydroquinone, amidol, metol, glycin, p-aminophenol and pyrogallol; and hydroxylamines, in particular, primary and secondary aliphatic and aromatic N-substituted or β-hydroxylamines which are soluble in aqueous alkali, including hydroxylamine, N-methyl hydroxylamine, N-ethyl hydroxylamine, and others described in U.S. Patent No. 2,857,276, issued Oct. 21, 1958, in the name of Edwin H. Land et al. Suitable silver halide solvents for these dispersions are: conventional fixing agents such as sodium thiosulfate, sodium thiocyanate, ammonium thiosulfate and others described in the aforementioned U.S. Patent No. 2,543,181; and associations of cyclic imides and nitrogenous bases such as associations of barbiturates or uracils, and ammonia or amines, and other associations described in U.S. Patent No. 2,857,274, issued Oct. 21, 1958, in the name of Edwin H. Land et al.

In silver diffusion transfer processes, the processing composition frequently contains sodium sulfite, which functions as an antioxidant to maintain the developing agent in the reduced state. This sodium sulfite, however, undesirably tends to harden the gelatin with which it comes in contact. It has been found that such sodium sulfite may be replaced by zinc, dispersed in accordance with the present invention, which has no hardening effect on gelatin but which serves as an effective antioxidant. FIG. 6 shows an assemblage comprising, in sequence, a support 144, a silver halide emulsion 146, a silver-receptive stratum 150 and a support 152. Processing composition 148 contains dispersed zinc as an antioxidant, as illustrated by the following example.

*Example*

Processing composition 148 having the following formulation:

| | Parts |
|---|---|
| Water | 1860 |
| Sodium carboxymethyl cellulose | 119 |
| Dispersed zinc | 3 |
| Sodium thiosulfate | 14.5 |
| Hydroquinone | 52 |
| Diethylamine | 100 | was prepared in the following manner: a dispersion of zinc in aqueous carboxymethyl cellulose is prepared by evaporating 10 parts of zinc onto 400 parts of 20 mesh carboxymethyl cellulose powder. Next, 121 parts of the resulting product is dissolved in 1860 parts of water. Then the hydroquinone, sodium thiosulfate and diethylamine are added, care being effected to prevent evaporation of the diethylamine. The dispersed zinc serves effectively as an antioxidant while the processing formulation is stored, and does not interfere with the silver transfer process effected by the composition when used.

The proportions of the ingredients in the processing fluids may be varied within wide limits, as is well known in the art.

Where the zinc is incorporated in the processing solution, care should be exercised to avoid the use of alkali metal hydroxides or other reagents which would tend to form zinc oxide, thus reducing the antioxidant activity of the dispersed zinc. Organic reagents, and particularly aliphatic amines, have been found effective to provide the requisite alkalinity without attacking the zinc.

It has been shown above that a dispersion of zinc may be effectively employed as an antioxidant in a photographic processing composition. The antioxidant properties of such a dispersion of zinc also may be effectively utilized in photographic sheet components, e.g., as a layer in an image-receiving element, said zinc dispersion being adjacent, i.e., in antioxidant relationship, to an imagewise distribution of image-forming components, e.g., dye developers, which image-forming components are susceptible to oxidation. The quantity of zinc so used is very small, and should not introduce undesirable color or opacity.

Since certain changes may be made in the above products, processes and compositions without departing from the scope of the invention herein involved, it is intended that all matter contained in the above description or shown in the accompanying drawings shall be interpreted as illustrative and not in a limiting sense.

What is claimed is:

1. A photographic developer composition comprising an aqueous solution including an aliphatic amine, an organic plastic material, a silver halide solvent, a silver halide developing agent, and finely dispersed zinc, said solution being free of alkali metal hydroxides or other reagents which would tend to form zinc oxide.

2. A photographic developer composition as defined in claim 1, said finely dispersed zinc being formed by the steps of vacuum depositing zinc upon an organic plastic material presenting a large surface area and mixing said vacuum deposited zinc and said organic plastic material with a solvent for said organic plastic material, said solvent being a nonsolvent for said zinc, thereby dissolving said organic plastic material and forming a fine dispersion comprising said vacuum deposited zinc as the discontinuous phase and said solvent and said organic plastic material as at least part of the continuous phase of said dispersion.

3. An image-receiving element for use in diffusion transfer processes and comprising at least a support and an image-receptive layer carried by said support, said image-receiving element including a small but effective amount of finely dispersed zinc so positioned as to be effective as an antioxidant for image-forming components present in said image-receiving element.

4. An image-receiving element for use in diffusion transfer processes and comprising at least a support and an image-receptive layer carried by said support, said image-receiving element including a small but effective amount of finely dispersed zinc so positioned as to be effective as an antioxidant for image-forming components present in said image-receiving element, said finely dispersed zinc being formed by the steps of vacuum depositing zinc upon an organic plastic material presenting a large surface area and mixing said vacuum deposited zinc and said organic plastic material with a solvent for said organic plastic material, said solvent being a nonsolvent for said zinc, thereby dissolving said organic plastic material and forming a fine dispersion comprising said vacuum deposited zinc as the discontinuous phase and said solvent and said organic plastic material as at least part of the continuous phase of said dispersion.

5. An image-receiving element as defined in claim 3, wherein said image-forming components are dye developers.

6. The method of forming a fine dispersion of zinc, comprising the steps of vacuum depositing zinc upon an organic plastic material presenting a large surface area and mixing said vacuum deposited zinc and said organic plastic material with a solvent for said organic plastic material, said solvent being a nonsolvent for said zinc, thereby dissolving said organic plastic material and forming a fine dispersion comprising said vacuum deposited zinc as the discontinuous phase and said solvent and said organic plastic material as at least part of the continuous phase of said dispersion.

References Cited

UNITED STATES PATENTS

| 2,686,716 | 8/1954 | Land | 96—29 |
| 2,691,588 | 10/1954 | Henn et al. | 96—66.4 |
| 2,709,663 | 5/1955 | McLean | 117—107.1 |
| 2,839,378 | 6/1958 | McAdow | 96—29 |
| 2,981,623 | 4/1961 | Burgardt et al. | 96—66.4 |

NORMAN G. TORCHIN, *Primary Examiner.*

J. P. BRAMMER, *Assistant Examiner.*